Sept. 21, 1965  L. A. HUFF  3,207,016
DEVICE FOR CUTTING SHEET MATERIAL
Filed Jan. 21, 1963
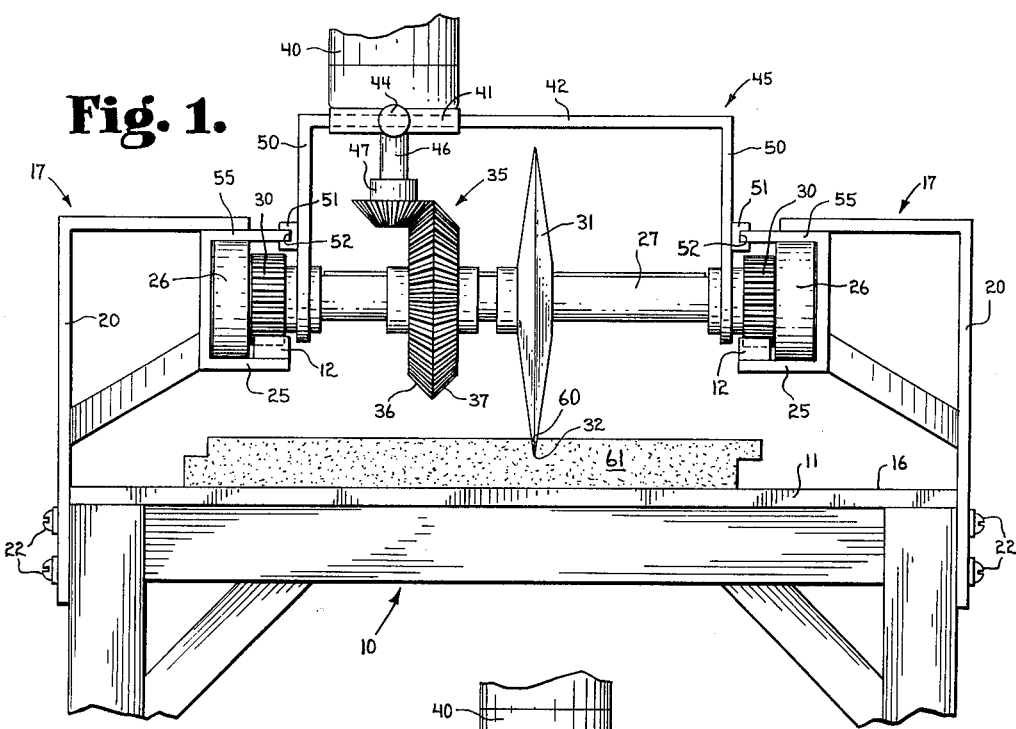
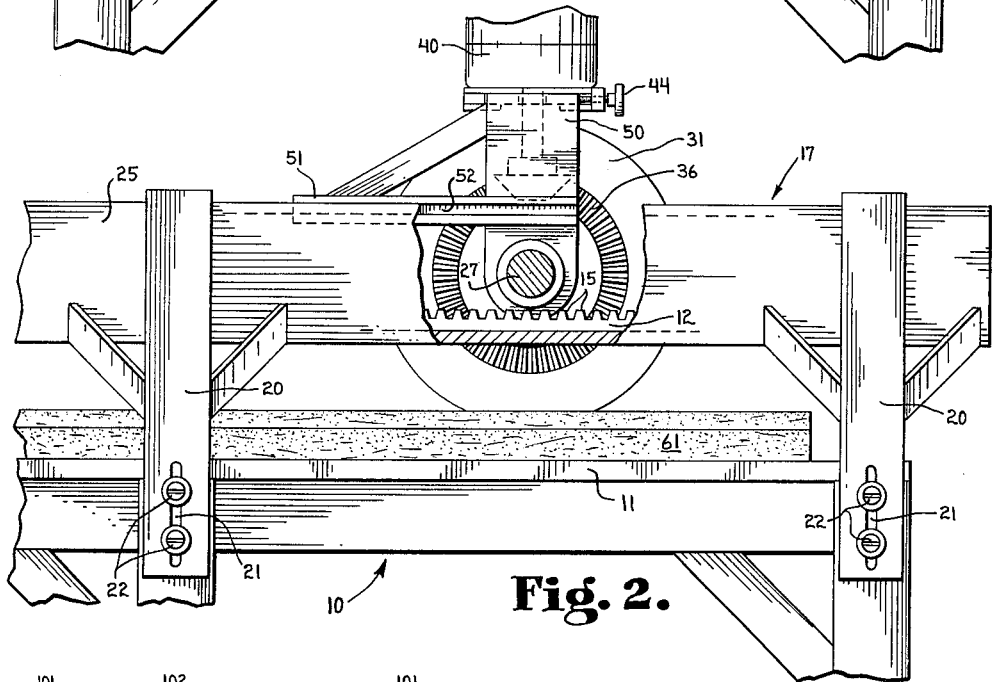
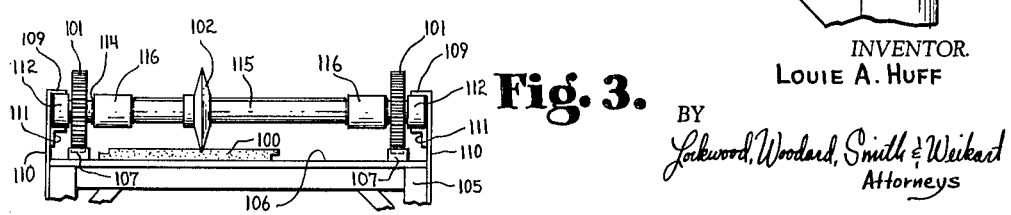
INVENTOR.
LOUIE A. HUFF
BY
Lockwood, Woodard, Smith & Weikart
Attorneys

United States Patent Office 3,207,016
Patented Sept. 21, 1965

3,207,016
DEVICE FOR CUTTING SHEET MATERIAL
Louie A. Huff, Box 111, Hutsonville, Ill.
Filed Jan. 21, 1963, Ser. No. 252,952
3 Claims. (Cl. 83—12)

The present invention relates to an apparatus for cutting sheet material and is particularly useful for cutting material such as asphalt siding.

The most common size of asphalt siding is 4′ x 1′ x ⅞″. It has been found that in cutting such asphalt siding, the blade need only cut approximately ¼″ through the siding thickness and the siding may then be perfectly broken along the cut to produce straight edges. When the cut is made in the above manner, the blade need not contact the surface upon which the siding is supported whereby unnecessary blunting of the blade is eliminated. Consequently, one object of the present invention is to provide an apparatus for cutting sheet material which will cut part way through sheet material in an even and straight manner.

Still another object of the present invention is to provide a device for cutting or slitting plastic sheet material and for cutting sheet material which is adhesive or "gummy."

Related objects and advantages will become apparent as the description proceeds.

One embodiment of the present invention might include a table and a pair of racks. Frame means are used to mount the racks in parallel relation to the table and to one another with the teeth of the racks projecting upwardly. A shaft is provided with a rotary blade keyed thereto coaxially therewith and with pinion gears fixed at or adjacent the opposite ends of the shaft. The frame means includes a pair of guide elements which project toward one another and are in spaced parallelism with said racks. The pinion gears meshingly engage the racks whereby rotation of said shaft causes movement of said shaft along said racks and causes rotation of said blade. A beveled gear is secured to the shaft and has two toothed surfaces beveled at equal but opposite angles relative to the axis of the shaft. An inverted U-shaped frame has its legs journaled on the shaft and has the guide members fixed thereto in order to maintain the U-shape frame at a fixed attitude relative to said table. A motor is mounted on the base of the U-shape frame and is operatively connected to said bevel gear for rotation of said shaft.

The full nature of the invention will be understood from the accompanying drawings and the following description and claims:

FIG. 1 is a fragmentary front elevation of an apparatus embodying the present invention.

FIG. 2 is a fragmentary side elevation of the structure illustrated in FIG. 1.

FIG. 3 is a fragmentary end elevation similar to FIG. 1 of an alternative embodiment of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a table 10 having a flat horizontal table top 11. A pair of racks 12 are mounted on said table with the teeth 15 of said racks projecting upwardly and with the racks in spaced parallelism to the upper flat surface 16 of said table top. The racks are mounted by means of frame structure 17 which includes L-shaped members 20 each having a slot 21 therethrough. A pair of screws 22 are used to secure the members 20 to the table. The members 20 may be adjusted upwardly or downwardly relative to the table by first releasing the screws 22 and by subsequently retightening the screws after the members 20 have been properly repositioned.

Fixed to the frame members 20 are inwardly opening channels 25 which extend longitudinally of the table 10 and table top 11. The channels 25 each receive a roller 26, the two rollers 26 being fixed or keyed to the opposite ends of a shaft 27. Also fixed or keyed to the shaft 27 is a pair of pinions 30 each of which is adjacent a respective roller 26 and each of which meshes with a respective one of the racks 12. It can be seen that each of the racks 12 is fixed to a respective one of the channels 25.

A rotary blade 31 is keyed to the shaft 27 for rotation therewith and has a diameter such that the lower edge 32 of the blade is spaced from the surface 16 of the table top 11. Assuming, for example, that the material usually cut is asphalt siding having a thickness of ⅞″, the lower edge 32 of the blade would be spaced from the table top 11 by a distance of ⅝″. This spacing, however, can be adjusted by means of the screws 22 in the manner above described.

Also keyed upon the shaft 27 is a bevel gear 35 having two toothed surfaces 36 and 37 which are beveled at equal but opposite angles relative to the axis of the shaft 27. A motor 40 is permanently mounted upon a mounting element 41 which is adjustable on the base 42 of a U-shaped frame 45. The mounting element 41 has a knurl headed setscrew 44 threaded thereinto and usable for fixing the mounting element 41 at a desired position on the U-shaped frame 45. The motor 40 has a drive shaft 46 at the distal end of which is mounted a bevel gear 47 which engages either the bevel surface 36 or the bevel surface 37.

In order to remount the motor so that the bevel gear 47 meshingly engages the surface 37 of the bevel gear 35, the setscrew 44 is unthreaded sufficiently to permit detaching of the mounting element 41 from the base 42. The mounting element 41 is then re-attached to the base 42 with the bevel gear 47 on the opposite side of the bevel gear 35 and the screw 44 retightened with bevel gears in proper meshing engagement. Of course, the purpose of such repositioning of the motor is to drive the bevel gear 35 in the opposite direction. An alternative embodiment of the apparatus might incorporate a reversible motor in place of the motor 40 but would otherwise be identical to the illustrated embodiment.

Fixed to the legs 50 of the U-shaped frame 45 is a pair of elongated guide members 51 each having a recess 52 extending longitudinally of the guide member 51 and each slidably receiving a leg 55 of a respective channel 25. Thus, the upper leg 55 of each channel acts as a guide element for the U-shaped frame 45 maintaining the U-shaped frame in inverted position relative to the apparatus.

It will be appreciated from the above description that operation of the motor 40 causes the shaft 27 to rotate through the bevel gears 47 and 35. Rotation of the shaft 27 causes rotation of the pinions 30 causing the shaft 27 and associated frame 45 to move longitudinally of the table. Because the shaft 27 is maintained at an equal distance from the surface 16 of the table top 11, the lower edge 32 of the blade 31 also maintains an equal distance from the table top. The rotation of the blade 31 cuts an indentation or slit 60 in the workpiece 61 whereby the workpiece may be broken cleanly into two separate pieces.

The apparatus illustrated in FIG. 3 is similar in many respects to the apparatus of FIGS. 1 and 2 but is primarily intended for cutting gummy or adhesive types of material. When cutting such materials, it is desirable that the blade rotate at the same speed that it is moving horizontally relative to the sheet material 100 being cut. The apparatus disclosed in FIG. 3 is capable of such operation because of the fact that the sprocket gears 101 are the same diameter as the cutter blade 102. Thus, a given linear movement of the sprocket 101 across the table produces a rotation of the blade 102 at such a speed that the outer diameter thereof is moving at the same speed as the linear movement. The apparatus disclosed in FIG. 3 is further distinguished from the apparatus of FIGS. 1 and 2 in that no drive motor is necessary and the cutter blade 102 is moved across the material 100 by manual operation.

The device of FIG. 3 includes a table 105 having a flat surfaced table top 106. Racks 107 are fixed directly to the table and have upwardly facing teeth which engage the teeth of the sprocket gears 101. Frame members 110 are secured to the table 105 at opposite sides and have an inverted L-shape similar to the frame member 17. Angles 111, which extend the complete length of the table, are fixed to each of the inverted L-shaped frame members 110 and in cooperation with the horizontal leg 109 of frame members 110, function as guide means for rollers 112.

The sprocket gears 101 are keyed to the shaft 115 and meshingly engage the racks 107. Inboard of the gears 101 are journaled handle assemblies 116 freely rotatable about the shaft 115 and retained against axial movement of the shaft 115 by means of suitable snap rings 114.

The operation of the device of FIGS. 3 is similar to the operation of the device of FIGS. 1 and 2. Instead of motor power, the user grasps the handle assemblies 116 and pushes the shaft 115 and associated structure across the table. The rollers 112 insure that the blade 102 maintains a constant spaced relation to the table top 106 by engaging the horizontal legs 109 of frame members 110 whereby the blade is forced into the material being cut. The device of FIG. 3 operates similarly to the device of FIG. 1 in that the workpiece 100 is not completely cut through but merely has an indentation or slit formed therein. Because of the fact that the blade 102 moves at the same rotary speed at its outer periphery as its linear speed across the table, the gummy or adhesive nature of the workpiece 100 does not hinder the rotation of the blade 102.

From the above description, it will be obvious that the present invention provides an improved device for cutting sheet material such as asphalt siding. It will also be clear that the present invention is particularly useful in cutting sheet material having an adhesive or gummy nature.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for cutting sheet material comprising a table having a flat horizontal upper surface, a pair of racks, frame means mounting said racks in parallel relation to said table and to one another and with the teeth of said racks projecting upwardly, a shaft, a rotary blade keyed to said shaft with the outer circumference of said blade in spaced relation to said table, rollers fixed to the opposite ends of said shaft, pinion gears fixed adjacent the opposite ends of said shaft and meshingly engaging said racks, said frame means including a pair of channels opening toward one another, the upper legs of said channels defining respective guide elements projecting toward one another and in spaced parallelism with said racks, a first bevel gear secured to said shaft and having two toothed surfaces beveled at equal but opposite angles relative to the axis of said shaft, an inverted U-shaped frame having its legs journalled on said shaft, a pair of elongated guide members each having a recess extending longitudinally thereof and slidably receiving one of said respective guide elements, said guide members being fixed to said U-shaped frame to maintain it at a fixed attitude relative to said table, a motor mounted on the base of said U-shaped frame with the drive shaft of said motor projecting downwardly, a second bevel gear mounted on the distal end of said drive shaft in meshing engagement with one of said two toothed surfaces, said motor being adjustable on said base to a new position wherein said second bevel gear is in meshing engagement with the other of said two toothed surfaces.

2. Apparatus for cutting sheet material comprising a table having a flat horizontal upper surface, a pair of racks, frame means mounting said racks in parallel relation to said table and to one another and with the teeth of said racks projecting upwardly, a shaft, a rotary blade keyed to said shaft, pinion gears fixed adjacent the opposite ends of said shaft and meshingly engaging said racks, said frame means including a pair of guide elements projecting toward one another and in spaced parallelism with said racks, a first bevel gear secured to said shaft and having two toothed surfaces beveled at equal but opposite angles relative to the axis of said shaft, an inverted U-shaped frame having its legs journalled on said shaft, a pair of elongated guide members each having a recess extending longitudinally thereof and slidably receiving one of said respective guide elements, said guide members being fixed to said U-shaped frame to maintain it at a fixed attitude relative to said table, a motor mounted on the base of said U-shaped frame with the drive shaft of said motor projecting downwardly, a second bevel gear mounted on the distal end of said drive shaft in meshing engagement with one of said two toothed surfaces, said motor being adjustable on said base to a new position wherein said second bevel gear is in meshing engagement with the other of said two toothed surfaces.

3. Apparatus for cutting sheet material comprising a table, a pair of racks, first frame means mounting said racks in parallel relation to said table and to one another and with the teeth of said racks projecting upwardly, a shaft, a rotary blade keyed to said shaft, pinion gears fixed adjacent the opposite ends of said shaft and meshingly engaging said racks, said frame means including a pair of guide elements projecting toward one another and in spaced parallelism with said racks, a first bevel gear secured to said shaft, a second frame having its legs journalled on said shaft, a pair of elongated guide members each having a recess extending longitudinally thereof and slidably receiving one of said respective guide elements, said guide members being fixed to said second frame to maintain it at a fixed attitude relative to said table, a motor mounted on said second frame with the drive shaft of said motor projecting downwardly, a second bevel gear mounted on the distal end of said drive shaft in meshing engagement with said first bevel gear.

References Cited by the Examiner

UNITED STATES PATENTS

| | | | |
|---|---|---|---|
| 316,752 | 4/85 | De Blanc | 143—47.2 |
| 668,771 | 2/01 | Butler | 143—47.4 |
| 2,777,521 | 1/57 | Tanis | 83—488 |

FOREIGN PATENTS

| | | |
|---|---|---|
| 20,567 | 6/05 | Austria. |
| 35,708 | 6/86 | Germany. |
| 289,206 | 12/15 | Germany. |
| 2,256 | 8/62 | Great Britain. |
| 509,241 | 7/39 | Great Britain. |
| 661,129 | 11/51 | Great Britain. |

ANDREW R. JUHASZ, *Primary Examiner.*